United States Patent [19]

Hruby

[11] 3,859,844
[45] Jan. 14, 1975

[54] SEALED CONTAINER PRESSURE GAUGING APPARATUS AND METHOD

[75] Inventor: Ronald J. Hruby, Campbell, Calif.

[73] Assignee: Material Metrics, Inc., Mountain View, Calif.

[22] Filed: Mar. 23, 1973

[21] Appl. No.: 344,413

[52] U.S. Cl. ................................. 73/45.4, 73/49.3
[51] Int. Cl. ............................................. G01m 3/36
[58] Field of Search ...................... 73/52, 45.4, 49.3

[56] References Cited
UNITED STATES PATENTS
| | | | |
|---|---|---|---|
| 1,825,699 | 10/1931 | Landrum | 73/49.3 |
| 1,974,026 | 9/1934 | Hicks | 73/49.3 |
| 3,441,132 | 4/1969 | Browning | 73/52 X |

*Primary Examiner*—James J. Gill
*Attorney, Agent, or Firm*—Flehr, Hohbach, Test, Albritton & Herbert

[57] ABSTRACT

An apparatus for use on line with evacuated container processing equipment for determining container internal pressure levels. The containers have at least one flexible wall portion capable of varying the charge status on a pair of capacitor plates in proximity with the wall portion by variation of the distance between the wall portion and the capacitor plates. The variation in charge on the capacitor plates is used to indicate the initial motion of the flexible wall portion caused by a change in the differential pressure across the wall portion. The apparatus includes a low pressure chamber, a valving system for controlling pressure adjacent to the flexible wall portion, means for automatically positioning the container and sampling the pressure adjacent to the wall portion at the time of initial motion, and means for rejecting the container from the line if the sampled pressure signal indicates container internal pressure level is inadequate.

16 Claims, 10 Drawing Figures

SEALED CONTAINER PRESSURE GAUGING APPARATUS AND METHOD

BACKGROUND OF THE INVENTION

This invention relates to an apparatus for testing the internal pressure of sealed containers, and for diverting those containers having unacceptable internal pressure levels, and more particularly to the measurement of vacuum levels in food cans for acceptance or rejection during or after the canning operation.

The determination of the internal pressure in a sealed vessel or container without physical violation of the container boundaries may be desirable in numerous sets of circumstances and for many purposes. For example the internal pressure, or vacuum, in a food can may be altered from normal by faulty sealing during the canning process or by chemical or biological activity within the food in the can occurring after sealing. A rise in internal food can pressure resulting from the above circumstances will almost inevitably result in serious after effects for persons consuming the food from such cans if the condition is allowed to go undetected.

The "flip" vacuum test is a well known can vacuum test procedure and is a test often prescribed by law for performance by food processors. The test involves subjecting a flexible wall of a food container to some pressure lower than atmospheric and gaining an indication of the internal pressure through observance of the flexible wall behavior. The flexible wall at some low pressure will "flip" outwardly which action may be observed visually, sensed audibly, or measured by detecting the position of the flexible wall portion after it has "flipped" out. Such tests are not precise measurements of internal container pressure due to forces resisting the "flip" motion of the flexible wall section within the wall section itself and the time required for the wall section to completely flex. There is, therefore, a need for a test apparatus and method which will more accurately measure the internal container pressure in a shorter period of time and which may be automated and installed in an "on line" status for use with container processing operations.

SUMMARY AND OBJECTS OF THE INVENTION

In general the pressure gauging system is for use in determining pressure levels inside sealed containers having a flexible wall portion responsive in position to varying external air pressure. External means is brought into sealed contact with a portion of the container surrounding the flexible wall portion thereby defining a chamber defining a space or volume between the external means and the wall portion. Means responsive to the initial velocity of the flexible wall portion provides a signal indicative of container internal pressure. Automated pressure controls means is in communication with the chamber. The chamber is alternately subjected to a predetermined range of test pressure and vented to ambient pressure in accordance with signals derived from the means reponsive to the initial velocity of the flexible wall section.

In general it is an object of the present invention to provide a vacuum gauging system for accurately determining the internal pressure of sealed containers.

Another object of the invention is to provide a vacuum gauging system of the above character for automatically testing the internal pressure in a sealed container and for diverting those containers without proper internal pressure levels from the normal flow of containers.

Another object of the invention is to provide a vacuum gauging system of the above character which will sense the initial motion of a flexible container wall upon subjecting the wall to a low external pressure for distinguishing container wall stresses from internal container pressures.

Another object of the invention is to provide a vacuum gauging system of the above character which sequences the test steps automatically allowing the equipment to be placed "on line" in a sealed container processing operation.

Additional objects and features of the invention will appear from the following description in which the preferred embodiment has been set forth in detail in conjunction with the accompanying drawings.

A DESCRIPTION OF THE PREFERRED EMBODIMENT

The invention disclosed herein automates the "flip" vacuum test and reduces the motion required at the flexible lid in performing the test. A reduced pressure is created above the lid and an electrostatic sensor detects initial lid velocity resulting from the pressure reduction as the pressure across the lid equalizes. Normally the pressure gradient across the lid rises toward the outside of the container and the lid is therefore stressed inwardly. Pressure equalization allows the lid to start moving outward towards an unstressed condition. This initial motion is sensed and the pressure over the lid sampled simultaneously. The sample pressure signal is compared with a reference signal and an accept/reject determination made immediately.

Figure 1:
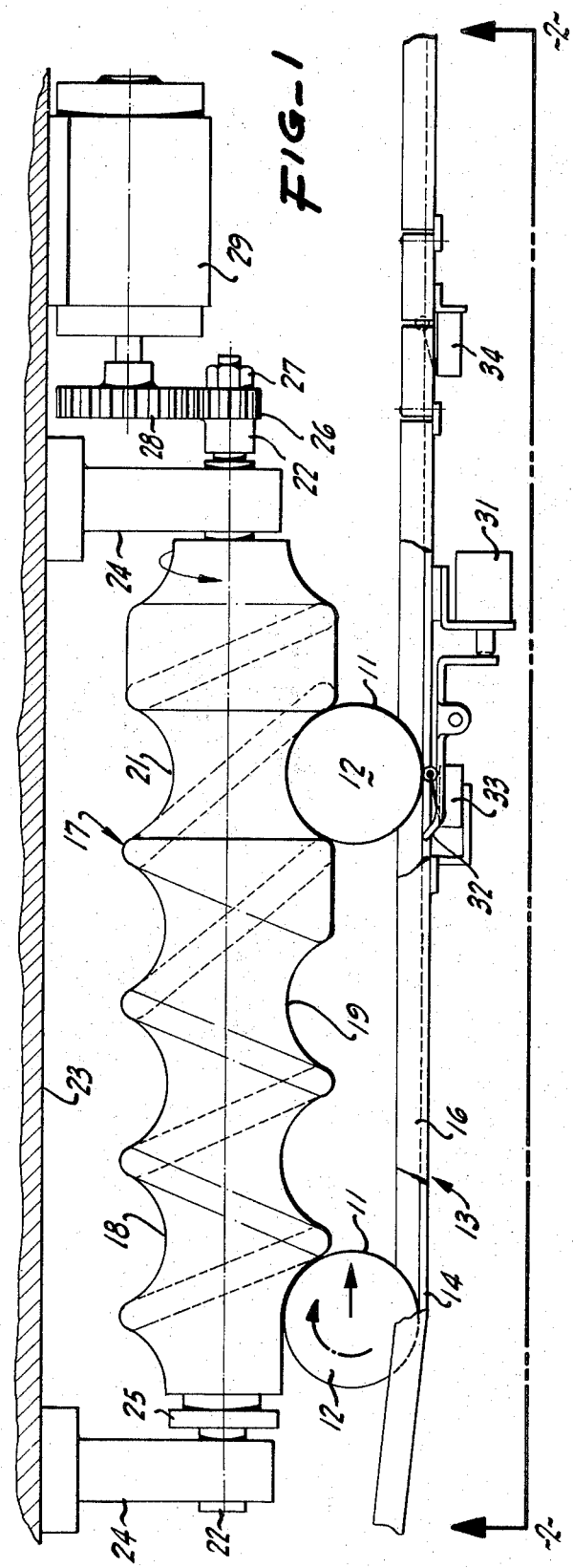
FIG. 1 is a side elevational view of the on line vacuum gauging installation.

Referring to FIG. 1 the major mechanical components for an "on line" installation of the vacuum gauging system are shown. In this embodiment the sealed containers are shown as metallic cans 11 having a circular cross section and flat metallic ends 12 providing a flexible wall portion for the cans 11. The cans 11 are disposed on their sides on a track generally indicated at 13 comprised of rails 14 and guides 16. The track 13 may be inclined slightly to provide gravity feed of the cans 11 to the point where they engage a lead screw 17 at the left end as shown in FIG. 1. The cans 11 may be stood on their ends and moved by conveyor belt as another embodiment not shown here.

Lead screw 17 has two regions of regular thread pitch 18, a region of high thread pitch 19, and a region of zero thread pitch 21. The form of the threads may be seen to fit the sides of the cans 11 in this embodiment, though this feature is not necessary.

Lead screw 17 is supported on a shaft 22 which is in turn supported from a framework 23 by lead screw brackets 24. The leading end of shaft 22 has a 180° cam 25 mounted thereon in precise angular relationship with zero thread pitch region 21. The drive end of lead screw shaft 22 mounts a gear 26 secured to the end of shaft 22 by a nut 27. Gear 26 is engaged by a drive gear 28 mounted on a shaft driven by an electric drive motor 29 which is mounted to frame 23.

A starter solenoid 31 is mounted to the underside of track 13 and engages can starter arm 32 at a position on track 13 termed the test station. A first proximity switch 33 is also mounted below track 13 at the test station. A second proximity switch 34 is also mounted beneath track 13 for engagement by cans 11 as they pass down flow from the test position at a position on track 13 termed the reject position.

Figure 2:
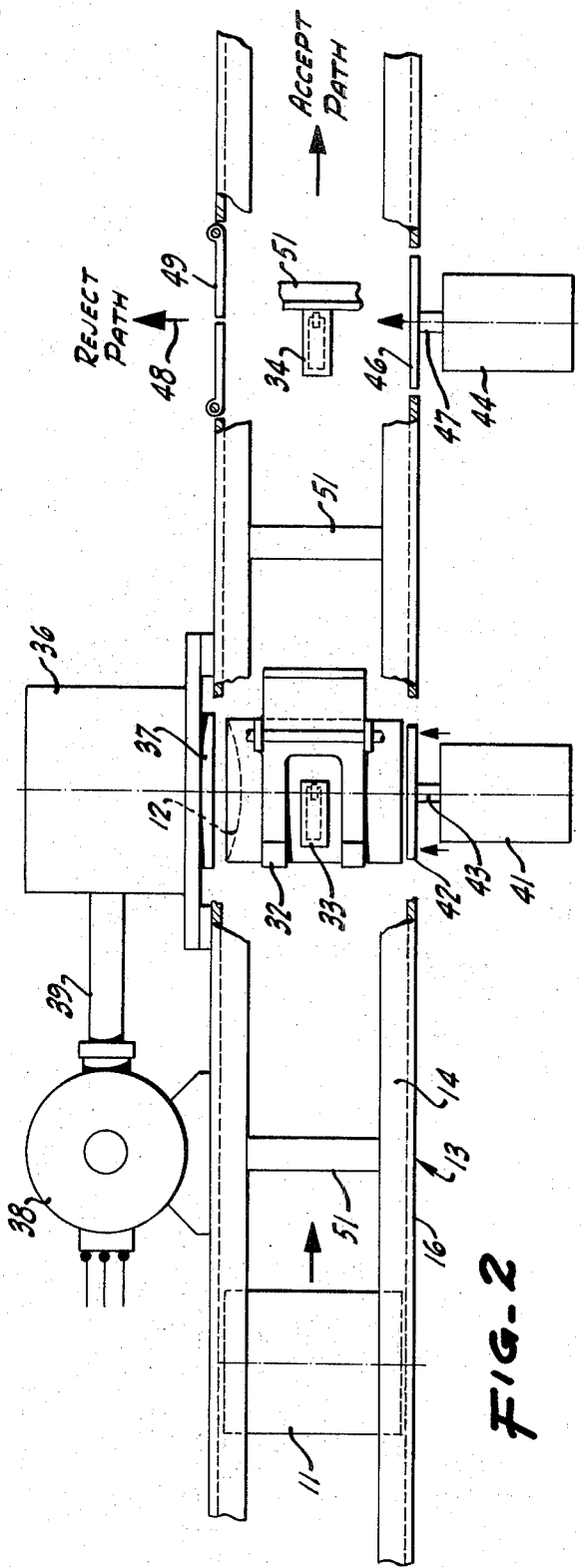
FIG. 2 is a view along the line 2—2 of FIG. 1.

Turning now to FIG. 2 a vacuum reservoir or evacuated chamber 36 is seen mounted adjacent to track 13 at the test station. A test plate 37 is one form of enclosure means for can end 12 and is mounted at the test station in communication with evacuated chamber 36 through valve system 67. An electrically driven vacuum pump 38 is shown connected to evacuated chamber 36 through pneumatic line 39. A can position actuator 41 is shown mounted adjacent to the test station on the opposite side of track 13 from the evacuated chamber 36. Can position actuator 41 has a plate 42 mounted on the end of an actuator drive rod 43 for contacting one end of cans 11. A chamber or space is defined by the can end 12 and test plate 37 when actuator 41 drives a can into sealed contact with test plate 37.

A can reject actuator 44 is positioned adjacent to track 13 at the can reject position having a plate 46 on the end of a can reject actuator drive rod 47. A reject path 48 is shown through normally closed doors 49 at the edge of track 13 opposite can reject actuator 44. Track cross brackets 51 are shown which provide strength for track 13 and mounting positions for components required to be mounted underneath track 13.

Figure 3:
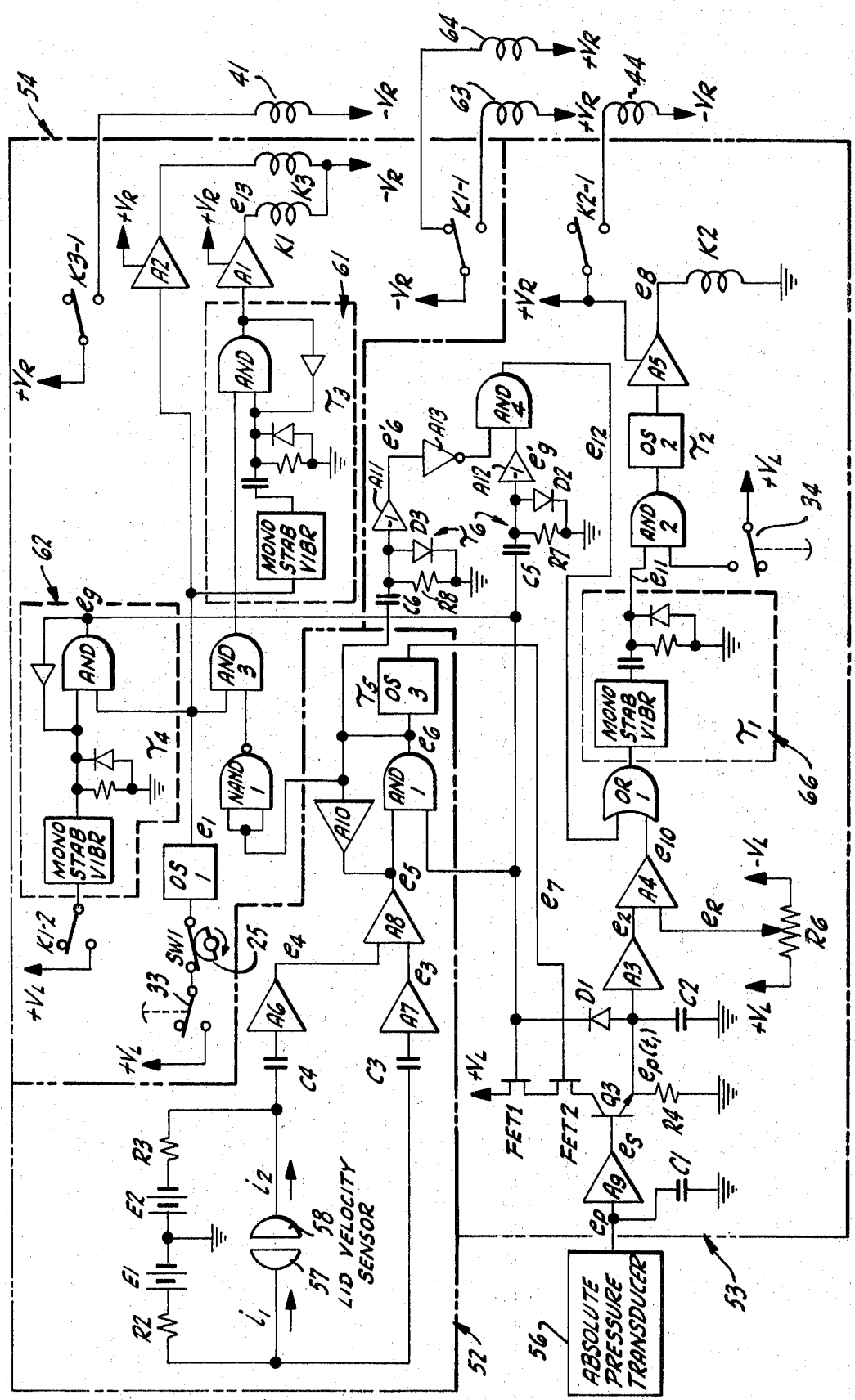
FIG. 3 is an electrical schematic of the circuits used in the vacuum gauging system.

Referring to FIG. 3 a schematic diagram of the circuit components providing the automated controls for the vacuum gauging system is shown. The circuit of FIG. 3 is generally constituted of three major sections. A can lid velocity sensor section 52 is connected to a can rejection logic circuit 53 and a can test sequence circuit 54, these latter two circuits also being interconnected. A pressure transducer 56 is shown providing an output $e_p$ to can reject logic circuit 53.

Figure 6:
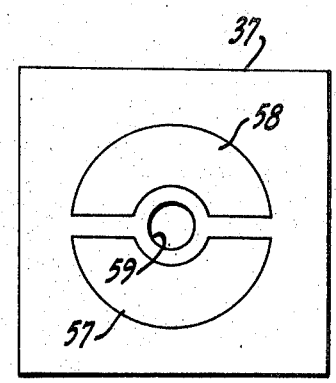
FIG. 6 is a plan view of one embodiment of the test plate.

Test plate 37 has installed two capacitor plates 57 and 58 which may be of the configuration shown in FIG. 6 and which are insulated from one another and from the frame 23 shown in FIG. 1. A hole 59 is centrally disposed in test plate 37 which vents the space between the test plate 37 and the can end 12 alternately to ambient pressure and the pressure in an evacuated chamber 36 depending upon the test sequence. Referring again to FIG. 3 capacitor plates 57 and 58 may be seen in lid velocity sensor circuit 52. A DC source of power E1 is connected between ground and capacitor plate 57 through resistor R2 to charge capacitor plate 57 positively. A DC source E2 is connected between ground and capacitor plate 58 through resistor R3 to charge capacitor plate 58 negatively. Capacitor plate 57 is coupled through capacitor C3 to amplifier A7 which provides an input to differential amplifier A8. Capacitor plate 58 is coupled through capacitor C4 to amplifier A6 which provides another input to differential amplifier A8. Differential amplifier A8 provides an output $e5$ which is directed to AND gate 1. The output of AND gate 1 is coupled back to the input receiving input $e5$ through unity gain buffer amplifier A10. The output of AND gate 1 is designated $e6$ and is directed to can test sequence logic 54. The signal $e6$ is also directed to one shot number 3 (OS 3) which provides an output designated $e7$ having a dwell time $\tau_5$ seconds long, which is directed to can reject logic 53.

Can test sequence logic 54 provides automatic test sequence and contains a switch SW1 which is actuated by the 180° cam 25. Switch SW1 is in series with can presence switch 33 in the test station and when both are closed the positive logic voltage $+V_L$ is connected to the input of one shot number 1 (OS 1) producing an output $e1$ which is connected to one input of AND gate 3. At time $t_0$, $e6$ in the lid velocity sensor circuit 52 is down, so that connection of $e6$ to NAND gate 1 in test sequence logic 54 produces an up output from NAND gate 1. $e1$ from OS 1 is connected to AND gate 3. E1 also triggers delay switch 61 which is enabled by the output of AND gate 3. Delay switch 61 is connected to the input of amplifier A1 which produces an output $e13$ delayed $\tau_3$ seconds and connected to relay coil K1.

Relay coil K1 switches contacts K1-2 for connecting positive logic voltage $+V_L$ at the trigger input of delay switch 62. Delay switch 62 is enabled by $e1$ and produces an output eg, delayed $\tau_4$ seconds, which is directed to the can reject logic 53. The output $e1$ from OS 1 is also directed to amplifier A2 which is connected to can position actuator relay coil K3. Energizing coil K3 connects a positive relay voltage $+V_R$ through contacts K3-1 to energize the coil of can position actuator 41. Actuation of relay coil K1 connects relay voltage through contacts K1-1 across a vacuum valve actuating coil 63. Prior to energizing relay coil K1 relay voltage is across a vent valve actuating coil 64.

Reject logic circuit 53 receives signal $e7$ to the gate of FET 2 from lid velocity sensor circuit 52, and signal eg to the gate of FET 1 from test sequence logic circuit 54. Signal ep is connected to the input of amplifier A9 which produces an output es directed to the base of transistor Q3. Signal eg enables the circuit from $+V_L$ through FET 1, FET 2, Q3, and resistor R4 to ground, and signal $e7$ triggers the circuit.

Capacitor C1 receives the output from pressure transducer 56. Capacitor C2 is connected between the emitter of transducer Q3 and ground, and diode D1 is connected between the emitter of Q3 and the gate of FET 1. The emitter of Q3 is connected to the input of amplifier A3 which produces an output $e2$ connected to voltage comparator A4. The reference voltage eR for comparator A4 is obtained from a tap on resistor R6. An output $e10$ from comparator A4 is connected to one input of an OR gate 1. A signal $e12$ is provided for the other input to OR gate 1 through the following connections. eg is connected to capacitor C5 which is connected to a parallel combination of R7 and D2 to ground. The high side of R7 is connected to the input of a "minus one" amplifier A12 which produces one input to an AND gate 4. $e6$ is connected to capacitor C6 which is connected to a parallel combination of R8 and D3 to ground as shown in FIG. 3. The high side of R8 is connected to the input of a "minus one" amplifier A11 which is connected to the input of an inverter A13. The output of inverter A13 is connected to provide a second input to AND gate 4. The output of AND gate 4 is signal $e12$ directed to OR gate 1.

The output of OR gate 1 may be termed a refection signal and is connected to delay trigger 66 producing an output $e11$ delayed $\tau_1$ seconds and directed to the input of AND gate 2. Container presence switch 34 when actuated provides a positive logic voltage $+V_L$ at the other input of AND gate 2. The output of AND gate 2 is directed to one shot 2 (OS 2) which in turn produces an output having a dwell time of $\tau_2$ seconds which is directed to amplifier A5. The output of amplifier A5 is designated $e8$ and is directed to reject relay coil K2. Relay coil K2 actuates contacts K2-1 placing positive relay voltage on the coil of can reject actuator 44.

Figure 4:
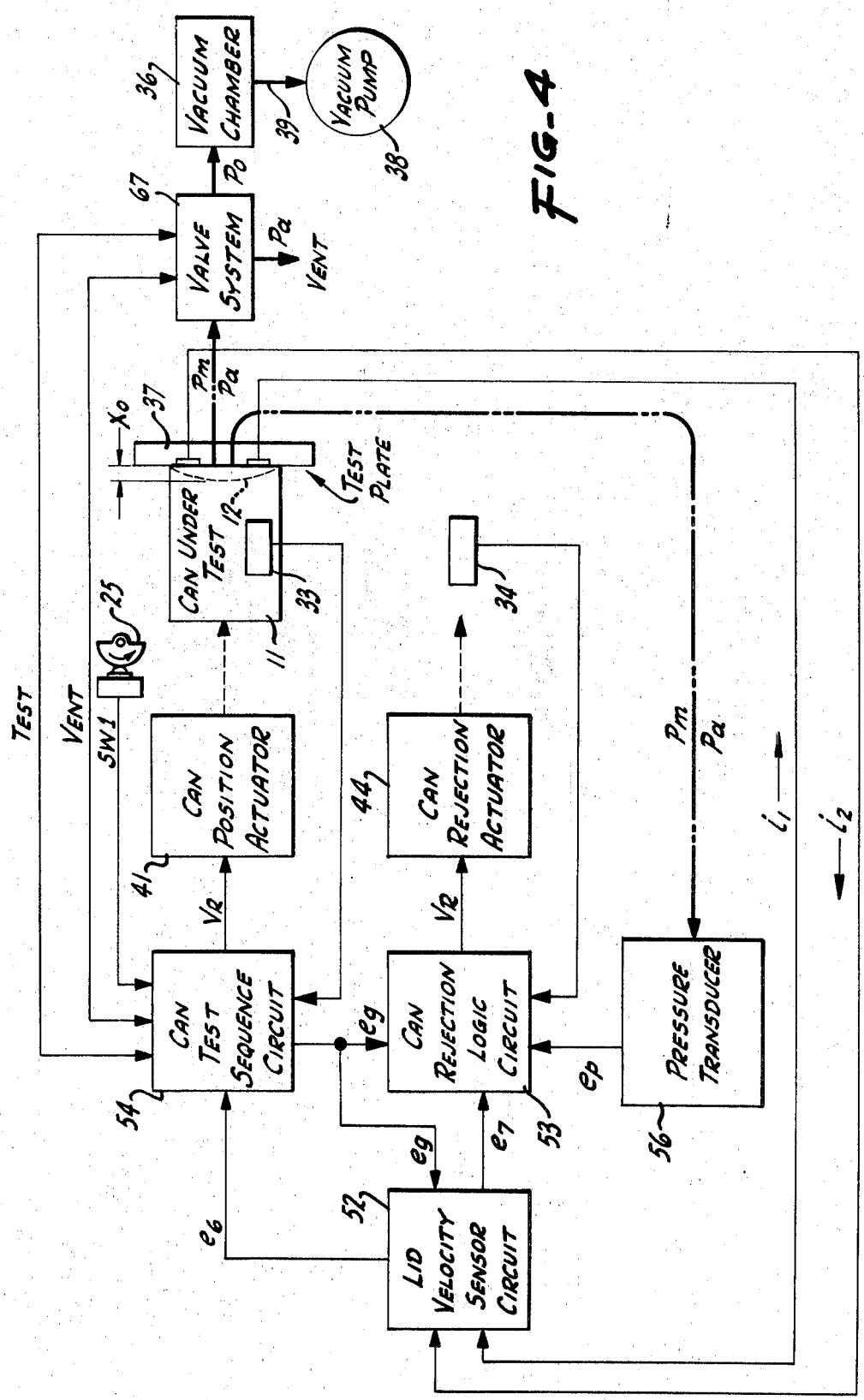
FIG. 4 is a block diagram of the vacuum gauging system shown in FIG. 1.

Referring to FIG. 4 the interrelation of the mechanical and circuit components discussed above may be seen. The vacuum pump 38 keeps evacuated chamber 36 at a pressure $p_o$ near minus 30 inches of mercury. Valve system 67 selects $p_o$ or ambient pressure $p_a$ for communication with the chamber formed by can end 12 and test plate 37 through hole 59 in plate 37. Pressure $p_m$ is the metered pressure in the chamber due to the finite time for the pressure in the chamber to fall when the valve system 67 selects $p_o$. $p_m$ in the chamber is sensed by pressure transducer 56 which provides a signal $ep$ proportional to pressure to can rejection logic 53. Reject logic 53 also receives a signal from can presence switch 34.

Lid velocity sensor circuit 52 receives signals $i_1$ and $i_2$ from the velocity sensor which senses initial change in distance $x_o$ as seen in FIG. 4. Signals are sent from velocity sensor circuit 52 to rejection logic circuit 53 and test sequence circuit 54. Test sequence circuit 54 generates signals for circuits 52 and 53 and also valve system 67. Switch SW1 is actuated by 180° cam 25 and together with can presence switch 33 in the test station provides signal for can test sequence circuit 54. Can position actuator 41 is energized by test sequence circuit 54 and can reject actuator 44 is energized by can reject logic 53.

Figure 5:
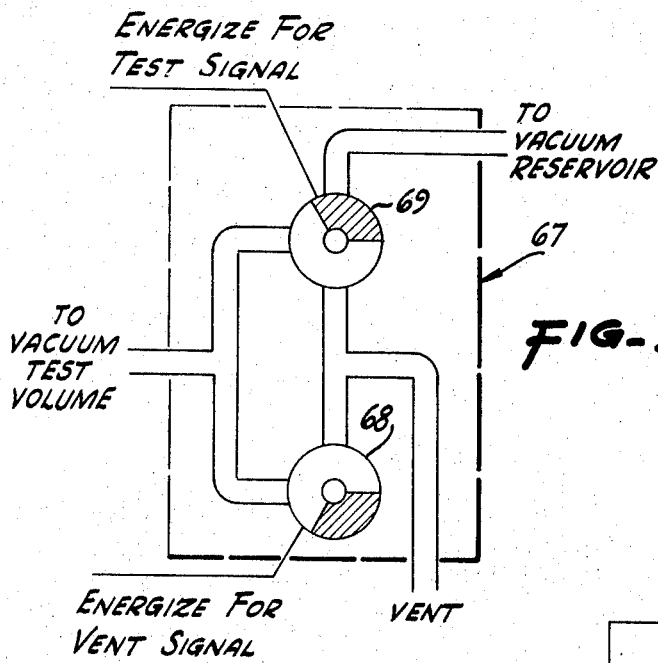
FIG. 5 is a mechanical representation of the valve system shown in FIG. 4.

Valve system 67 must be capable of communicating the space between test plate 37 and the flexible can end 12 alternately with vacuum chamber 36 and ambient pressure. The valving change must be performed quickly to realize the full advantage in short test performance time made possible by the lid velocity sensor. Preferably, a single valve with actuating time sufficiently short for the purposes herein described would be utilized. Some valves display a characteristically short actuating time when energized, and a relatively long time to resume their normally open de-energized position upon removal of the actuating signal. In such a case, valve system 67 may have the configuration shown in FIG. 5. When relay coil K1 in FIG. 3 is not energized, contacts K1-1 assume the position as shown in FIG. 3. Voltage is placed across vent valve actuating coil 64 which is located in pneumatic valve 68 in FIG. 5. When coil K1 is energized voltage is placed across vacuum valve actuating coil 63 through contacts K1-1 in FIG. 3 which is located in pneumatic valve 69 in FIG. 5. Pneumatic valve 69 alternately communicates the space or test volume between can end 12 and test plate 37 with the evacuated chamber 36 and ambient pressure. Pneumatic valve 68 alternately communicates the same space with ambient pressure and isolates the space from ambient pressure.

In operation one form of valve system 67 may function as follows. When relay coil K1 is not energized vent valve actuation coil 64 is energized through contacts K1-1 and valve 68 is actuated to the open condition venting the test volume to ambient air. Pneumatic valve 69 is seen to be de-energized, when relay coil K1 is energized, pneumatic valve 69 is actuated by vacuum valve actuating coil 63 and pneumatic valve 68 assumes a closed position isolating the test volume from ambient pressure. Valve 69 moving more quickly upon being energized immediately communicates the test volume with the evacuated chamber 36. Valve 68 moving more slowly upon being de-energized has not yet closed at this time. Valve 68 having closed completely and the remainder of the testing cycle being completed, coil K1 is de-energized. Valve 69 now moves toward a position to isolate the test volume from the evacuated chamber 36. Valve 68 meanwhile immediately assumes the position to vent the test volume to ambient pressure thus arresting the flexing motion of the can end 12.

Turning now to the operation of the system reference is made to FIG. 1. Several means may be used to space the cans to be tested as container lots proceed along the processing line represented by track 13. In the embodiment shown a lead screw 17 with varying pitch accelerates a container 11 to be tested from the point where it initially contacts lead screw 17 until it reaches the test station above can presence switch 33. Other means such as conveyor belts having differing speeds and carrying the containers 11 on end may be used. For purposes of describing the vacuum gauging system disclosed herein the lead screw 17 has 180° of zero pitch immediately over the test station. Cam 25 is set to actuate a switch SW1 in FIG. 3 for the 180° that the container 11 is caused to dwell in the test position by the zero pitch on the lead screw 17. Lead screw 17 is driven at a constant speed in this embodiment by motor 29 through gearing 28 and 26.

In the test position container 11 depresses first can presence switch 33, and cam 25 closes switch SW1 which is in series with switch 33 allowing the positive logic voltage $+V_L$ to be delivered to OS 1 as shown in FIG. 3 for 180° of rotation of lead screw 17. OS 1 produces a voltage $e1$ which serves as the input to amplifier A2 which produces an output energizing relay coil K3. Relay coil K3 actuates contacts K3-1 actuating the positioning solenoid 41 and pressing the can 11 against the test plate 37.

Signal $e1$ from OS 1 is also delivered as one input to AND gate 3. With no vacuum yet applied to the space between the can end 12 and the test plate 37 the output from differential amplifier A8, shown as $e5$ in FIG. 3, may have transients of arbitrary level which are delivered as one input to AND gate 1. The other input to AND gate 1, $eg$, is zero. Thus the output of AND gate 1 $e6$ is zero, placing two zero inputs on NAND gate 1 which provides output delivered as the second input to AND gate 3. This produces an up output from AND gate 3 which enables the AND gate in delay switch 61.

Voltage $e1$ is also connected as the input to the monostable multivibrator in delay switch 61. A trigger pulse is produced by the circuit shown following the multivibrator which provides a trigger signal to the AND gate in delay switch 61 causing the AND gate output to rise. Delay switch 61 thus produces an "up" state output which is used to latch delay switch 61 through a buffer amplifier to the trigger input of the AND gate in switch 61. The output of delay switch 61 is delayed $\tau_3$ seconds in the following manner. A monostable multivibrator in switch 61 is triggered at $t_o$ by $e1$. A rising signal at $t_o$ at the output of the multivibrator is connected to and charges a capacitor in switch 61. The charging current at $t_o$ is conducted in the conventional direction from ground through a diode in switch 61 having its anode at ground. When the negative multivibrator signal rises at the end of its dwell time a charging current flows conventionally through the capacitor to ground through a resistor in parallel with the back biased diode in switch 61. Thus a positive pulse delayed by the dwell time of the monostable multivibrator pulse is generated at the cathode of the diode. This positive pulse is used to trigger the AND gate in switch 61 which is then latched on through the buffer amplifier from the output to the trigger input of the AND gate in delay switch 61. This delay of the trigger signal in delay switch 61, delays the input to amplifier A1 which produces an output $e13$ for energizing relay coil K1 which is also delayed $\tau_3$ seconds. Relay coil K1 actuates contacts K1-1 closing pneumatic valve 68 to isolate the test volume between test plate 37 and can end 12 from ambient pressure and to communicate the test volume with the pressure in the evacuated chamber 36 as described above in the description of valve system 67.

Energizing relay coil K1 also closes contacts K1-2 placing a positive logic voltage $+V_L$ at the input to delay switch 62. Delay switch 62 functions in the same fashion as delay switch 61 providing an output $eg$ with a time delay of $\tau_4$ seconds. In this fashion $eg$ can be seen to be delayed for the sum of $\tau_3$ and $\tau_4$ seconds after $t_o$ which provides time for mechanically and electrically generated transients to pass.

Figure 10:
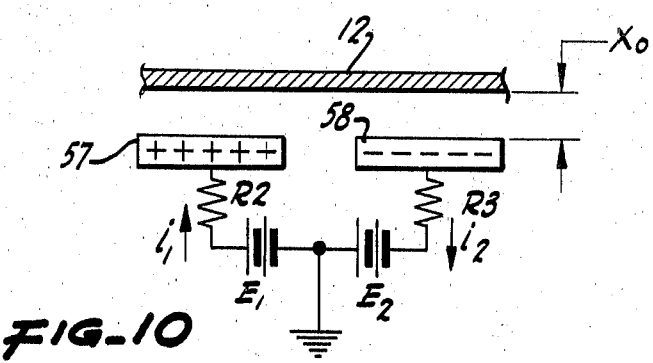
FIG. 10 is a diagrammatic drawing of the velocity sensor.

Actuation of vacuum valve coil 63 by closure of relay coil K1 opens pneumatic valve 68 to evacuated chamber 36 creating a decreasing pressure in the test volume between can end 12 and test plate 37. Referring to FIG. 10 the distance $x_o$ is shown as the distance between the center of the can end 12 and the capacitor plates 57 and 58 in the lid velocity sensor. When can end 12 begins to move toward capacitor plates 57 and 58 the charge on the capacitor increases, which can only occur by charge flow, or current, which is shown as $i_1$ increasing the positive charge on capacitor plate 57, and $i_2$ increasing the negative charge on capacitor plate 58. Can end 12 is caused to move toward the capacitor plates by equalizing the pressure across can end 12 by decreasing the external pressure adjacent thereto. The following relationships show that for small motions of can end 12 the charging currents, $i_1$ and $i_2$ are proportional to the initial velocity of can end 12.

$$V_1 = E1 + E2$$
$$V_o = dx_o/dt$$
$$C_1 = KA (1)/(x_o) = K_o/x_o \text{ since } K_o = KA$$

$A$ is area of capacitor plates
$K_o$ is a constant of proportionality $$V_1 C_1 = Q$$
$$d(V_1 C_1)/dt = dQ/dt = -i_2 = i_1$$
$$C_1 dV_1/dt + V_1 dC_1/dt = i_1 = -i_2 \ \& \ dV_1/dt = 0$$
$$dC_1/dt = K_o d(1/x_o)/dt = (K_o/x_o 2)(dx_o/dt) = C_1/x_o V_o$$
(for small $x_o$)
$$V dC_1/dt = -V_1 C_1/x_o V_o = i_1 = -i_2$$

The charging currents $i_1$ and $i_2$ generated as can end 12 begins its motion are coupled through capacitors C3 and C4 to amplifiers A7 and A6 respectively. The output from amplifiers A7 and A6, $e3$ and $e4$ respectively, are connected to differential amplifier A8 which produces output signal $e5$ which is the sum of input signals $e3$ and $e4$. When $e5$ crosses a predetermined threshold AND gate number 1 is fired, having been enabled by $eg$. AND gate 1 produces an output $e6$ which is used to latch AND gate 1 through buffer amplifier A10 back to the $e5$ input of AND gate 1. Voltage $e6$ is also utilized to trigger OS 3 which produces an output $e7$ having a predetermined dwell time $\tau_5$.

Figure 9:
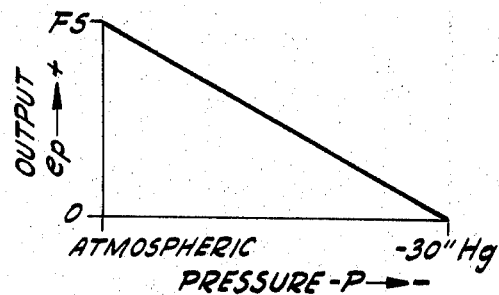
FIG. 9 is a graph of the pressure transducer output as a function of pressure.

Absolute pressure transducer 56 has an output characteristic as shown in FIG. 9. At atmospheric pressure full scale output is produced which decreases to 0 at approximately minus 30 inches of mercury. Therefore the output $ep$ of absolute pressure transducer 56 decreases as the pressure decreases, or as the vacuum becomes greater.

Pressure transducer 56 output $ep$ is stored on capacitor C1 and is connected to the input of amplifier A9. FET 1 is enabled by voltage $eg$ and FET 2 is triggered by voltage $e7$ placing the voltage $+V_L$ on the collector of transistor Q3. Transducer Q3 conducts at a level determined by the magnitude of the output $es$ from amplifier A9 at the base of Q3. A charge $ep(t_1)$ is placed upon capacitor C2 when Q3 conducts which is proportional to the charge on capacitor C1. Conduction occurs only for the dwell time of trigger signal $e7$ at which time FET 2 is turned off.

Figure 7:
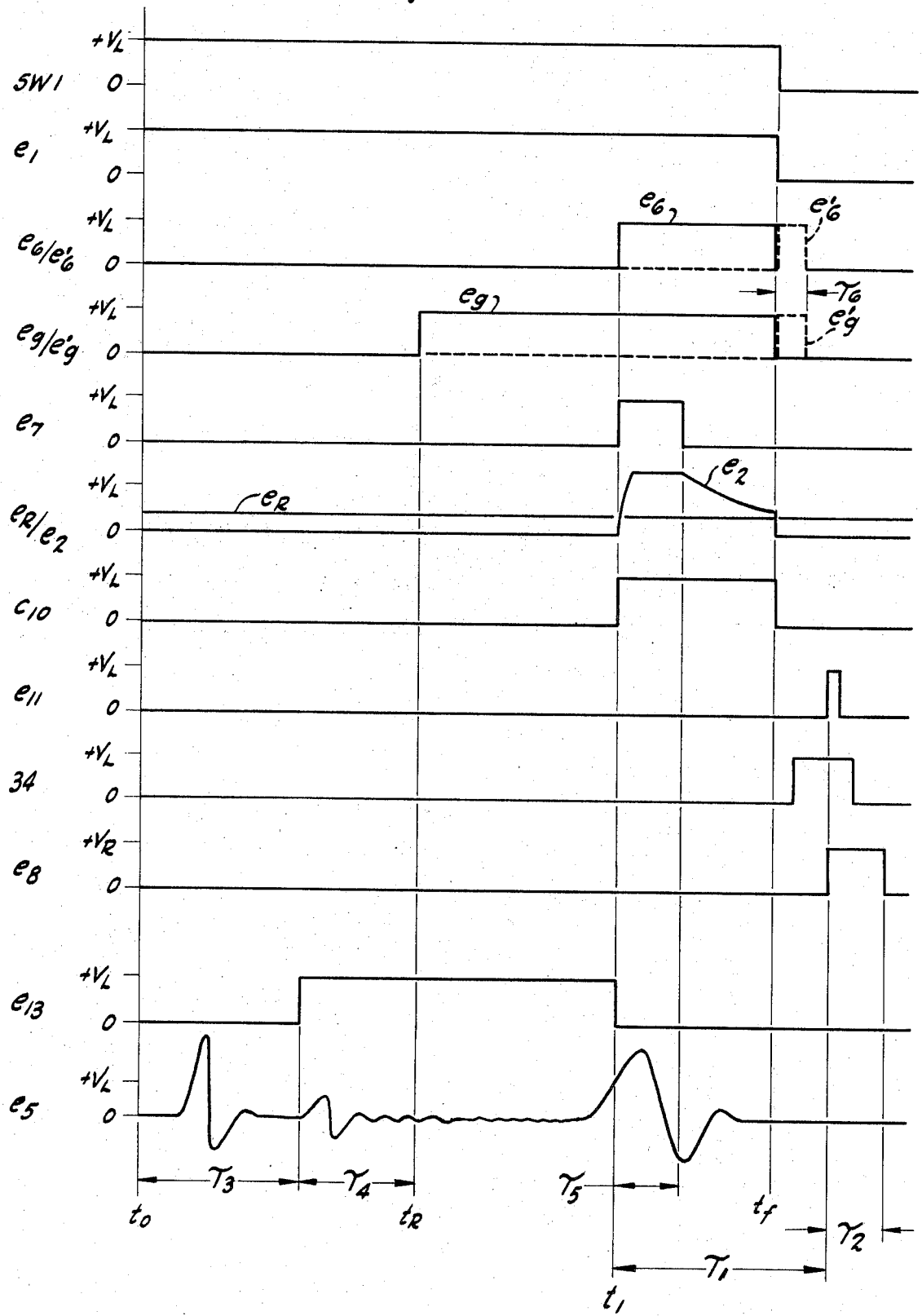
FIG. 7 is a timing diagram for a test showing a container internal pressure determined to be too high.
Figure 8:
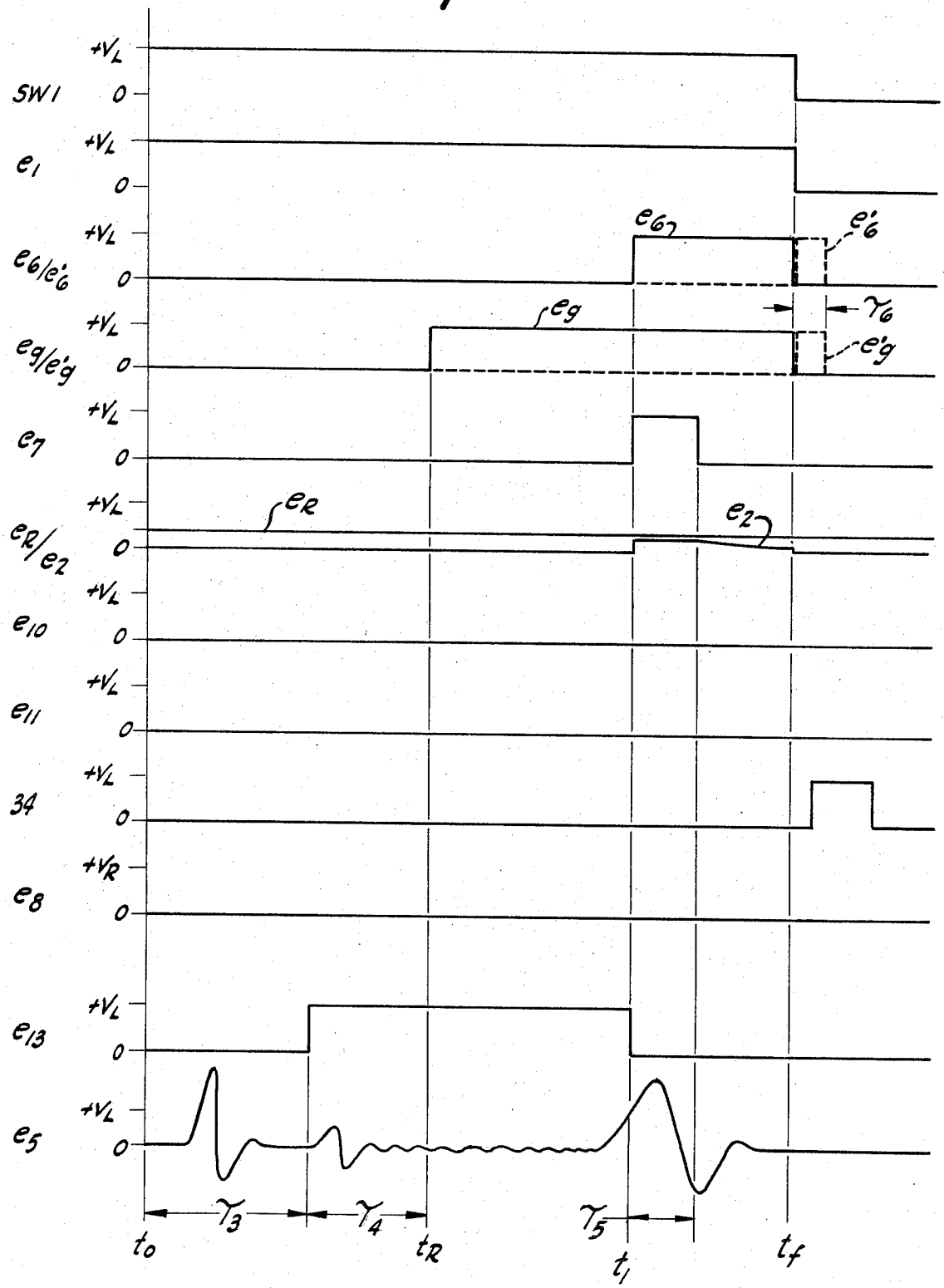
FIG. 8 is a timing diagram for a test of a container having an acceptable internal pressure.

Capacitor C1 is large enough to smooth noise signals from pressure transducer 56, but small enough to transfer the pressure wave form from the transducer output to capacitor C2 during the dwell time $\tau_5$ of signal $e7$. The charge transferred to capacitor C2 is connected to the input of amplifier A3 producing an output $e2$, related to $ep$, which is provided to the input of voltage comparator A4. The predetermined voltage level $eR$ for comparison is picked off of resistor R6 and connected to the another input of comparator A4. If $e2$ is greater than the reference voltage $eR$ the significance is that internal can pressure is too high because the pressure across can end 12 was equalized at too high a pressure as evidenced by the motion of can end 12. In such a case comparator A4 produces an output $e10$ which is provided to OR gate 1. The other input $e12$ to OR gate 1 may only exist after $e10$ has returned to a down state as seen in FIGS. 7 and 8. Therefore OR gate 1 produces an output signal to delay trigger 66 which produces an output signal after a time delay $\tau_1$ in the same manner as time delays $\tau_3$ and $\tau_4$ are produced in delay switches 61 and 62 respectively. The output of delay trigger 66 is connected to AND gate 2 which also receives the positive logic voltage $+V_L$ when second can presence switch 34 is actuated by passage of a container. AND gate 2 produces an output to OS 2 which produces an output having a dwell time of $\tau_2$. The output of OS 2 is connected to amplifier A5 which produces an output voltage $e8$ for energizing relay coil K2. Relay coil E2 actuates contacts K2-1 energizing can reject solenoid 44 for forcing a rejected container 11 off of track 13 along reject path 48 as indicated in FIG. 2.

In the event $e2$ is less than the comparison voltage input $eR$ to comparator A4 no output is generated from the comparator as the container 11 is acceptable, and it is allowed to pass along track 13 on the accept path as indicated in FIG. 2.

OR gate 1 may be induced to provide an output or rejection signal to delay trigger 66 for causing a can reject sequence to occur as described above by another means. An output $e12$ from AND gate 4 delivered to OR gate 1 will accomplish the same result. Signals $eg'$ and $e6'$ are generated only on the fall of signals $eg$ and $e6$ respectively. They both fall at $t_f$. This is the cut off point for $e10$ as seen in FIG. 7. Therefore, $e10$ and $e12$ cannot exist simultaneously so that either signal, when it does exist, will cause OR gate 1 to assume an "up" state and trigger delay trigger 66.

When signal $eg$ is up it signifies that a test is taking place. When $eg$ falls the charge on capacitor $c5$ is dissipated as a charge flow, or current, flows conventionally from ground through R7 creating a negative pulse at the input to minus one amplifier A12. A positive or up output is provided from A12 which is one input to AND gate 4. Thus if a test is conducted $eg'$ is an up signal and if no test is conducted it is down.

If $e6$ goes to an up state because $e5$ has passed the threshold to fire AND gate 1, then a positive pulse $e6'$ is produced at the output of minus one amplifier A11 in the same way as $eg'$ described above. $e6'$ is connected to the input of inverter A13 which inverts $e6'$. The inverted $e6'$ is connected as a second input to AND gate 4. Thus, if $e6$ goes up during a test the fall of $e6$ generates the second input to AND gate 4 which is down and if $e6$ does not rise during a test the second input to AND gate 4 is up.

From the above descriptions it is evident that if a test is commenced and pressure in can 11 is either very nearly equal to ambient or the test volume leaks due, for example, to faulty seating of the can 11 on test plate 37, the can end 12 may not move. No signal $e5$ will be generated, AND gate 1 will produce no signal $e6$, and FET 2 will not be turned on since OS3 will not generate signal $e7$. No comparator output $e10$ will be produced from A4 and a bad can 11 may be allowed to pass or a faulty test performed. To circumvent this situation, which may exist when a test is performed and no velocity sensor output occurs, signal $e12$ is connected to OR gate 1. As seen above, if $e6$ is already down so it cannot fall, the output of inverter A13 is up. If $eg$ is present indicating a test in progress the output of minus one amplifier A12 assumes an up state at $t_f$ when $eg$ falls. AND gate 4 fires sending an input to OR gate 1. The other input to OR gate 1 from comparator A4 is down after $t_f$ and delayed trigger 66 is fired providing a container reject sequence as heretofore described. Any other combination of $e6$ and $eg$ produces an input combination to AND gate 4 which will provide an output to OR gate 1 which will not actuate delay trigger 66. The other combinations are outlined below:

$e6$ up and $e6'$ up; produces A13 down.
$eg$ up; produces $eg'$ up.
A13 down and $eg'$ up; produces $e12$ down.
$e6$ up and $e6'$ up; produces A13 down.
$eg$ down; produces $eg'$ down.

A13 down and $eg'$ down; produces $e12$ down.
$e6$ down and $e6'$ down; produces A13 up.
$eg$ down; produces $eg'$ down.
A13 up and $eg'$ down; produces $e12$ down.

When the dwell time of $e1$ is completed the enabling input to delay switch 62 is removed and $eg$ falls. With $eg$ down the charge on capacitor C2 dissipates immediately through diode D1 setting up capacitor C2 to receive the next sample charge $ep$ ($t_1$) from pressure transducer 56 when FET 2 is turned on by the next $e7$ pulse. Prior to the fall of $eg$ the charge on C2 is kept up for the input of amplifier A3 for a period of time as determined by resistor R4.

The fall of pulse $e1$ from OS 1 turns off AND gate 3, and turns off delay switch 61 by removing the enable signal from the AND gate contained therein which shuts off amplifier A1 and de-energizes relay coil K1. Amplifier A2 is also turned off de-energizing relay coil K3 and the container position actuator 41, allowing containers 11 to proceed down track 13. At the same time the vacuum valve coil 63 is de-energized by repositioning contacts K1-1 as shown in FIG. 3. In this manner the test plate 37 is isolated from the evacuated chamber 36 when coil K1 is de-energized.

Referring to FIG. 7 a timing diagram of the prominent signals generated in the circuitry is shown. $+V_L$ is shown occurring at $t_o$ from switch SW1 which actuates OS 1 producing $e1$. $e1$ dwell time which extends to $t_f$. $e6$ is down at $t_o$ as AND gate 1 produces a zero state as explained above. $eg$ is also down at $t_o$ rising after the sum of time delays $\tau_3$ and $\tau_4$. $e7$ is shown rising at the same time as $e6$ since $e6$ is the trigger signal for OS 3 which produces $e7$. $e7$ has a dwell time of $\tau_5$ seconds as shown in the diagram.

FIG. 7 shows the condition where $e2$ exceeds $eR$ which is one condition which requires that the container tested be rejected.

$e2$ exceeding $eR$ causes comparator A4 to produce output voltage $e10$ at $t_1$. $e10$ places an up state at the output of OR gate 1 as explained above which energizes delay trigger 66. $e11$ is a trigger pulse output from delay trigger 66 delayed $\tau_1$ seconds, which will only trigger AND gate 2 if can presence switch 34 is closed, placing the positive logic voltage on the other input of AND gate 2. Delay time $\tau_1$ is to allow the can 11 time to transit from the test position to the point on track 13 where it actuates switch 34. When both inputs are present at AND gate 2 simultaneously, a trigger signal is generated for OS 2 which energizes amplifier A5 for the dwell time $\tau_2$ of OS 2. Dwell time $\tau_2$ is for the purpose of energizing relay coil K2 long enough to actuate can reject solenoid 44 through contacts K2-1, but short enough to assure that can reject actuator 44 is repositioned prior to the arrival of the next container 11 on track 13.

$e13$ is the output of amplifier A1 which energizes relay coil K1 and is delayed $\tau_3$ second so that initial transients in $e5$ due to mechanical positioning of the container 11 will have no effect on the circuit. At this time, after $\tau_3$ seconds, the seal is effected between the container 11 and the test plate 37 and transients from solenoid actuation are seen on the output $e5$. This is the reason for instituting the additional time delay $\sigma_4$ prior to allowing $eg$ to rise to enable the circuit through FET 1, FET 2, Q3 and R4 to ground. At time $t_R$, after $\tau_3$ and $\tau_4$ seconds have elapsed, the system is ready to measure. Therefore the presence of $eg$ in an up state is indicative that a test cycle is being performed. $e5$ begins to rise as the can end 12 begins to move, passing through a voltage sufficient to fire AND gate 1 at time $t_1$. At this time $e13$ goes down as shown in FIGS. 7 and 8.

$e2$ being greater than $eR$ in FIG. 7 the time delay $\tau_1$ generated in delay trigger 66 is instituted to allow for mechanical handling of the container 11 from the test station to the reject position over can presence switch 34 on track 13 as explained above. $e1$ falls readying the circuit for another test, container 11 is rejected along reject path 48 as also described above, and the system is prepared for testing another container 11.

Referring to FIG. 8, a timing diagram is shown for a test of a container 11 having a sufficiently low internal pressure to be acceptable. Again switch SW1, OS 1 output $e1$, and signal $eg$ are generated as above. Time delays $\tau_3$ and $\tau_4$ beginning at $t_0$ and ending at $t_R$ are generated in delay switches 61 and 62 respectively. The vacuum is communicated with the can end 12 at the end of $\tau_3$ seconds. The lid velocity sensor produces an output $e5$ at $t_1$ sufficient to generate output $e6$ from AND gate 1. $e7$ triggers the series circuit from $+V_L$ through FET 1, FET 2, Q3, and R4 to ground, transferring the charge on capacitor C1 to capacitor C2 as above. In this instance the input signal amplifier A3 does not produce an output exceeding $eR$ and comparator A4 produces no output voltage. The vacuum is removed from the test plate 37 by the fall of voltage $e13$ and the container is released from the test position by the fall of the voltage $e1$ which removes the output of amplifier A2 de-energizing relay coil K3. Container 11 continues down track 13 passing over switch 34, but AND gate 2 does not fire due to the absence of trigger signal $e11$. Container 11 continues down track 13 in the flow of acceptable containers.

The invention disclosed provides a vacuum test method which involves delivering a container 11 to a test station and delaying it for a period of time sufficient to perform a test. Seating the container against a test plate 37 with a force provides a seal between the bottom of the container and the test plate. Evacuating a test volume formed between the can end 12 and test plate 37 provides a pressure below ambient adjacent to a velocity sensor in test plate 37. Generating a signal by sensing the initial velocity of the flexible can end 12 and provides an internal pressure indication for can 11. A pressure transducer monitors the pressure in the test volume continuously. Sampling the pressure signal at the time the initial velocity of the can end 12 occurs, provides a signal level for comparison with a predetermined signal level. The sampled pressure transducer signal indicates actual pressure level internally in the container 11, because the can end 12 will only begin to move when the pressure across the can end 12 is equalized. Determining whether to accept or reject the can 11 is performed in additional circuitry which receives the signal resulting from the comparison. Rejecting cans 11 from the line which have high internal pressure or which have been found faulty as indicated by the tests, the system allows cans 11 with acceptable internal pressures to continue on the line. Positioning the cans 11, testing them in the test station, and processing them after the test is completed is all performed automatically. It should be noted that while the embodiment disclosed is in terms of an evacuated container and reduced pressure in the chamber defining the test volume, the pressure gauging system and method could be used for measuring pressure in a pressurized container, increasing the pressure in the test volume and utilizing a pressure transducer capable of detecting pressures higher than ambient in the test volume.

A vacuum gauging system and method has been provided which accurately and automatically determines the internal pressure of a sealed container in a minimum amount of time by sensing the initial flexing velocity of a flexible wall of the container. The system may be installed "on a line" to automatically direct containers along a flow path for acceptable containers or divert those subjected to inadequate tests or having either an inadequate seal or interior bacterial activity.

I claim:

1. In a pressure gauging system for determining the internal pressure in a sealed container having a flexible wall, means cooperating with said flexible wall forming a chamber therewith, means for introducing a pressure to said chamber to cause said flexible wall to move as the pressure in said chamber equalizes with the internal pressure, and means responsive to initial velocity of said flexible wall as it flexes said last named means spaced from said flexible wall and providing a first electrical signal indicative of initial wall velocity, a pressure transducer responsive to the pressure in said chamber and providing a second electrical signal indicative thereof, and means for sampling said second electrical signal actuated by said first electrical signal, whereby the internal pressure determination is independent of the distance through which said flexible wall moves.

2. A pressure gauging system as in claim 1 wherein said means cooperating with said flexible wall forming a chamber comprises a member for isolating said flexible wall portion from ambient pressure adapted to conform to the external surface of said container surrounding said flexible wall portion, and means for forcing the container into sealed contact with the conforming surface of said member, together with means for providing a third electrical signal for indicating when sealed contact is not obtained.

3. In a pressure gauging system for determining the internal pressure in a sealed container having a flexible wall, means cooperating with said flexible wall forming a chamber therewith, means for introducing a pressure to said chamber to cause said flexible wall to move as the pressure in said chamber equalizes with the internal pressure, and means responsive to initial velocity of said flexible wall as it flexes to indicate the pressure in said chamber, wherein said means for introducing a pressure in said chamber comprises a test sequence circuit providing a time delayed output, means for causing said container to dwell proximate to said means cooperating with said flexible wall for a predetermined length of time and for forming said chamber prior to the beginning of said time delayed output, means connected to said test sequence circuit for synchronizing the test with container dwell time at said test station and for generating a zero time reference, and valve means for communicating said pressure with said chamber actuated by said time delayed output.

4. In a pressure gauging system for determining the internal pressure in a sealed container having a flexible wall, means cooperating with said flexible wall forming a chamber therewith, means for introducing a pressure to said chamber to cause said flexible wall to move as the pressure in said chamber equalizes with the internal pressure, and means responsive to initial velocity of said flexible wall as it flexes to indicate the pressure in said chamber wherein said means responsive to initial velocity of said flexible wall comprises a velocity sensor providing an output signal when said flexible wall begins to move, a velocity sensor circuit for receiving said velocity sensor output and for generating a sampling signal and a chamber venting signal responsive to a predetermined velocity sensor output level, pressure sensing means receiving said sampling signal for monitoring said chamber pressure and producing an output related to chamber pressure at the time the sampling signal occurs, and valve means actuated by said chamber venting signal for communicating said chamber with ambient pressure.

5. A pressure gauging system as in claim 4 together with means for receiving said output related to chamber pressure, means for providing a reference signal related to a limit for internal pressure, means for comparing said output related to chamber pressure and said reference signal, a rejection signal output from said means for comparing when said chamber pressure is beyond said limit and means responsive to said rejection signal for rejecting containers with indicated internal pressure beyond said limit.

6. A pressure gauging system as in claim 5 together with circuit means for producing a first signal indicative of a test taking place, circuit means providing a second signal responsive to said velocity sensor output, and circuit means combining said first and second signals, said circuit means combining operating to provide said rejection signal output when a test is performed and no velocity sensor output occurs.

7. A vacuum gauging system for use in determining vacuum level inside sealed metal containers having a flexible wall portion, comprising a test plate adapted to communicate with the flexible wall portion to define a test volume therebetween, means in communication with said test volume for providing a signal indicative of initial velocity of flexing of the flexible wall portion, an evacuated chamber, a valve system in communication with said evacuated chamber and with ambient pressure for providing varying pressure levels to said test volume, a test sequence circuit for communicating said varying pressure levels with saids means for providing said signal indicative of initial velocity and for providing a container positioning signal, means for positioning the container proximate to said test plate responsive to said container positioning signal, a pressure transducer for sensing said varying pressure levels and providing a signal responsive thereto, means for providing a predetermined reference signal representing a maximum container internal pressure level, means for providing a sampling signal responsive to said signal indicative of initial velocity, and means for receiving said sampling signal and generating an additional signal related to said signal responsive to varying pressure levels and comparing said additional signal with said reference signal.

8. A vacuum gauging system as in claim 7 wherein said means for providing a signal indicative of initial velocity of flexing comprises first and second capacitor plates together with means for charging said first and second capacitor plates to predetermined positive and negative charge levels respectively, whereby said charge on said first and second capacitor plates begins to change when the flexible wall portion begins to move, and means for amplifying said change in charge thereby providing said signal indicative of initial velocity of flexing.

9. A vacuum gauging system as in claim 7 wherein said valve system includes first and second electrically actuated valves, said first valve for venting said test plate to said evacuated chamber, said second valve for alternately isolating said test plate from ambient pressure and venting said test plate thereto.

10. A vacuum gauging system as in claim 7 wherein said test sequence circuit includes first and second time delay means, said first time delay allowing for time to position said container adjacent to said test plate prior to actuating said valve system, said second time delay providing time for passage of mechanically and electrically generated electrical transients prior to sensing output from said means providing a signal indicative of initial velocity of flexing.

11. A vacuum gauging system as in claim 7 wherein said means for comparing said additional signal and said reference signal produces a rejection signal when container internal pressure exceeds the maximum, together with means for rejecting the container responsive to said rejection signal.

12. In a vacuum gauging system for determining internal pressure levels in sealed containers having at least one flexible metal wall section, and an evacuated chamber, a valve system in communication with said evacuated chamber and ambient pressure, enclosure means in communication with said valve system for providing sealed contact with the containers and forming a chamber between said enclosure means and the flexible wall section, a velocity sensor in communication with said chamber for detecting motion of the flexible metal wall section, a pressure transducer for sensing pressure in said chamber and providing output responsive thereto, circuit means for receiving output from said velocity sensor and for providing an automatic test sequence, means for rejecting containers from a lot of containers, and a rejection circuit for receiving said pressure transducer output signal and comparing it to a reference signal for determining relative container internal pressure and for generating a rejection signal when said internal pressure is relatively high, said means for rejecting containers responsive to said rejection signal.

13. In a vacuum gauging system for use with sealed food containers having at least one flexible wall section, a track for guiding the containers, a lead screw for advancing the containers along said track, a motor for driving said lead screw, an evacuated chamber mounted adjacent to said track, means mounted adjacent to said track for providing sealed contact with the containers surrounding the flexible wall section and forming a space therebetween, means for communicating said space alternately with said evacuated chamber and ambient pressure, a velocity sensor in communication with said space for detecting initial velocity of the flexible wall section and for producing an output related thereto, a pressure transducer for sensing pressure in said space and providing output responsive thereto, a velocity sensing circuit for receiving said output related to initial velocity and providing an output at the time of said initial velocity and circuit means responsive to said velocity sensing circuit output for sampling said pressure transducer output and for actuating said means for communicating said space with ambient pressure.

14. A vacuum gauging system as in claim 13 together with container reject means for removing containers from said track, and a rejection circuit for receiving said sampled pressure transducer output, said rejection circuit operating to generate an output which actuates said reject means when said sampled pressure transducer output indicates internal container pressure above a predetermined maximum.

15. A vacuum gauging system as in claim 14 together with circuit means for providing a signal indicative of a test cycle and means for combining said output related to initial velocity of the flexible wall section and said signal indicative of a test cycle, said means for combining operating to produce an output which actuates said reject means when a test indication signal is present and no velocity sensor output is produced.

16. The method of gauging the internal pressure in a sealed container having one flexible section comprising the steps of delivering a container to a test station, delaying the container at the test station for the test period, surrounding the flexible wall section with a sealed chamber, controlling the pressure in the chamber, sensing initial motion of the flexible wall section as the pressure across the section equalizes, so that the method is independent of the distance through which the flexible wall section moves, sensing when a faulty test is performed, sampling the chamber pressure at the time of the initial motion, comparing the sampled pressure with a predetermined limit reference pressure, rejecting containers displaying internal pressures beyond the limit or which have been subjected to a faulty test, and accepting containers displaying internal pressures within the limit.

* * * * *